(12) United States Patent
Wambsgans (10) Patent No.: US 11,052,411 B2
(45) Date of Patent: Jul. 6, 2021

(54) DEVICE AND METHOD TO CREATE NANO-PARTICLE FLUID NUCLEATION SITES IN SITU

(71) Applicant: Richard Marcelin Wambsgans, Gallatin Gateway, MT (US)

(72) Inventor: Richard Marcelin Wambsgans, Gallatin Gateway, MT (US)

(*) Notice: Subject to any disclaimer, the term of this patent is extended or adjusted under 35 U.S.C. 154(b) by 0 days.

(21) Appl. No.: 16/158,126

(22) Filed: Oct. 11, 2018

(65) Prior Publication Data
US 2019/0105673 A1    Apr. 11, 2019

Related U.S. Application Data

(60) Provisional application No. 62/570,676, filed on Oct. 11, 2017.

(51) Int. Cl.
| | |
|---|---|
| *F25C 3/04* | (2006.01) |
| *B05B 1/14* | (2006.01) |
| *C02F 1/00* | (2006.01) |
| *C02F 103/42* | (2006.01) |
| *B05B 7/08* | (2006.01) |

(52) U.S. Cl.
CPC ............. *B05B 7/08* (2013.01); *B05B 1/14* (2013.01); *C02F 1/001* (2013.01); *F25C 3/04* (2013.01); *C02F 2103/42* (2013.01); *C02F 2303/04* (2013.01); *F25C 2303/046* (2013.01); *F25C 2303/048* (2013.01); *F25C 2303/0481* (2013.01); *F25C 2500/02* (2013.01)

(58) Field of Classification Search
CPC .......... F25C 3/00; F25C 3/04; F25C 2303/00; F25C 2303/046; F25C 2303/048; F25C 2303/0481; F25C 2500/02; B05B 1/14; B05B 7/08; C02F 1/001; C02F 2103/42; C02F 2303/04
See application file for complete search history.

(56) References Cited

U.S. PATENT DOCUMENTS

| | | | | | |
|---|---|---|---|---|---|
| 3,393,529 | A | * | 7/1968 | Torrens | F25C 3/04 62/121 |
| 3,829,013 | A | * | 8/1974 | Ratnik | F25C 3/04 239/14.2 |
| 4,353,504 | A | * | 10/1982 | Girardin | F25C 3/04 239/14.2 |
| 4,759,503 | A | * | 7/1988 | Kraus | A01G 15/00 239/14.2 |
| 4,793,554 | A | * | 12/1988 | Kraus | A01G 15/00 239/14.2 |
| 6,508,412 | B1 | | 1/2003 | Pergay et al. | |

(Continued)

*Primary Examiner* — Darren W Gorman
(74) *Attorney, Agent, or Firm* — Eandi Fitzpatrick LLP (57) ABSTRACT

A nozzle device and method for creating a fluid nucleation in situ, is disclosed. The nozzle has a housing having a hollow interior, an outer cylindrical wall, and inlet and an outlet, and a diffuser disposed in the cylindrical tube at a first end toward the inlet. The diffuser is configured to break bonds between adjoining fluid molecules and create a nucleation event. The nozzle further has a mesh framework disposed in the cylindrical tube and extending longitudinally within the tube in the nucleation zone, and is configured to manipulate the bonding and un-bonding of water molecules within a pressurized environment for the production of snow, clean water or both.

12 Claims, 6 Drawing Sheets

(56) References Cited

U.S. PATENT DOCUMENTS

| | | | |
|---|---|---|---|
| 6,793,148 B2 * | 9/2004 | Ratnik | ................. B05B 1/14 |
| | | | 239/14.2 |
| 7,131,598 B2 * | 11/2006 | Ratnik | ................. F25C 3/04 |
| | | | 239/14.2 |
| 2004/0004134 A1 | 1/2004 | Santry | |
| 2004/0050949 A1 | 3/2004 | Duper | |
| 2006/0079137 A1 | 4/2006 | Walter | |
| 2007/0152079 A1 | 7/2007 | Santry | |
| 2009/0032608 A1 | 2/2009 | Kincade | |
| 2009/0114735 A1 | 5/2009 | Collins | |
| 2011/0174895 A1 | 7/2011 | Ratnik | |

\* cited by examiner

DEVICE AND METHOD TO CREATE NANO-PARTICLE FLUID NUCLEATION SITES IN SITU

CROSS-REFERENCE TO RELATED APPLICATIONS

This application claims the benefit of U.S. Provisional Application No. 62/570,676 entitled Water Molecule Manipulator, filed on Oct. 11, 2017 which is incorporated herein by reference in its entirety.

FIELD OF THE INVENTION

The present invention relates to a device and method to create cavitation of a fluid such as water molecules. More particularly, the invention relates to a device or nozzle that is operable with existing pumps or snow guns to create nano-particle water nucleation sites in situ thereby removing damaging particles, optimizing pH, and/or optimizing water molecule size depending upon a desired end use.

BACKGROUND OF THE INVENTION

Water molecules by very their nature tend to attract towards each other and create a bond or surface tension that bridges between the molecules, thereby reducing the total exposed surface area of the individual water molecules when grouped together compared to being independent of each other.

One method of breaking these bonds is through cavitation. Cavitation is defined as is the formation of vapor cavities in a liquid, small liquid-free zones, that are the consequence of forces acting upon the liquid. It usually occurs when a liquid is subjected to rapid changes of pressure that cause the formation of cavities in the liquid where the pressure is relatively low.

Classically, cavitation was a phenomenon to be prevented because of the significant deleterious effects it has on equipment, and was thought a scourge because of the damage in in causes to rotor blades and the like. Collapsing voids that implode near to a metal surface cause cyclic stress through repeated implosion. This results in surface fatigue of the metal causing a type of wear also called "cavitation". The most common examples of this kind of wear are to pump impellers, and bends where a sudden change in the direction of liquid occurs.

However, harnessed appropriately, cavitation can be used for cleaning of water and wastewater and can remove various particulates, metals, bacterium (e.g. cyanobacteria) green microalgae (e.g., *Chlorella vulgaris*), and viruses (Rotavirus) from water, while balancing pH. Swimming pool water, for example, may comprise bacteria, such as *E. coli, Shigella* (which causes dysentery), *Campylobacter* and *Salmonella*. While the addition of chlorine can kill a majority of bacterium, harmful metals may build up in the water, two being iron and copper, each of which are undesirable.

Further, cavitation can be used as part of sequence to manipulate how water molecules are joined to isolate them on a molecular level, where particular water size can mean the massive differences in output and quality of output.

For example, in a snow cannon or a snow gun, each of which comprise electric motor-driven fan type having a plurality of nozzles open to the circulation of fan-driven air passing axially through the front end of a cylindrical carrier for the fan and motor. Some compressed air may be fed with the water to the nozzle to facilitate the formation of ice crystals along with the fan induced flow. They may also utilize a mixing chamber into which is fed compressed air and water under pressure through separate lines. The snow gun includes a snow making nozzle which functions to convert water from a hose into droplets and to insure that the droplets are substantially frozen before they hit the ground. The majority of snow gun designs utilize compressed air to both atomize a water stream and impress a high velocity to the water droplets so that they have enough time in the ambient air to freeze. Unfortunately, utilizing known designs, a significant amount of water is lost due to evaporation, and the quality of the snow is lacking.

Of note, snowmaking machines generally require between 3,000-4,000 cubic meters of water per hectare of slope covered. Accordingly, snowmaking machines use about 107 gallons of water per minute and a significant amount of water is not returned to the water table. Furthermore, it takes approximately 3.5 to 4.3 kWh of energy to produce one cubic meter of snow, and thus, snow making accounts for approximately 50% of the average American ski resort's energy costs.

Furthermore, due to the materials the materials of the nozzles, calcification occurs on the nozzles, and when there can be thousands of nozzles on one resort, they need to be cleaned weekly if not more.

What is needed is an intermediately device or nozzle that can be connected to existing pumps or snow making devices that obviate the issues with past systems and methods.

SUMMARY OF THE INVENTION

To achieve the forgoing and other aspects and in accordance with the purpose of the invention, the subject device provides a nozzle for creating a fluid nucleation in situ. In one embodiment, the nozzle comprises a housing having a hollow interior, an outer cylindrical wall, and inlet and an outlet. The nozzle comprises a radially inner cylindrical tube concentrically positioned inside the housing, which defines a fluid nucleation zone. The nozzle further comprises a diffuser disposed in the cylindrical tube at a first end towards the inlet. The diffuser is configured to break bonds between adjoining fluid molecules and create a nucleation event. The nozzle further comprises a mesh framework disposed in the cylindrical tube and extending longitudinally within the tube in the nucleation zone. The nozzle further comprises an end plate having a predetermined amount of perforations. The end plate is disposed in the cylindrical tube and is spaced from the mesh framework at or near the outlet.

In another embodiment, a method for creating a fluid nucleation in situ, comprises the steps of: (a) connecting a nozzle to a fluid source, wherein the nozzle comprises a diffuser, a mesh framework and an end plate, (b) breaking bonds between adjoining fluid molecules and creating a nucleation event by the diffuser, (c) increasing pressure on the fluid molecules at a plurality of orifices of diffuser to create a heat signature, wherein the heat signature is configured to cleanse the fluid of foreign matter, (d) creating partial fusion process by the mesh framework to enable un-bonded fluid molecules come back together in close proximity, (e) freezing the un-bonded fluid molecules to provide nano-clusters of fluid molecules, and (f) attaching a snow gun to an outlet of the nozzle to discharge snow particles.

The present device and method provides an intermediary device that is positioned within the flow of water and functions by the pressure created from a pump or other device to increase the pressure of water flow through a confined space such as a hose or pipe.

The present device and method provides a fission process that breaks the surface tension and bond between adjoining fluid molecules. Another object of the present invention is to create a heat signature that forces the water molecules apart in a hydrophobic environment burning off any foreign matter and particulates, thereby cleansing the fluid molecule.

The present device and method provides a mesh framework that that creates a partial fusion process in which the un-bonded fluid molecules come back together in close proximity while balancing pH due to the frameworks metal makeup.

The present device and method provides a device with an ability to manipulate the bonding and un-bonding of water molecules within a pressurized.

The present device and method achieves multiple results and outcomes by varying the number of holes or orifices that enhance the ability to utilize a collective source of fluid or water molecules in a variety of applications.

The present device and method provides water free of bacteria, algae, and other foreign matter and contaminants while maintaining a balanced pH level, such as use with a swimming pool.

The present device and method provides optimized water molecule non-clusters for snow making at ski resorts.

The present device and method prevents calcification around nozzle heads of snow guns. The treated water reduces molecular water groups to the minimum size, increasing the molecular group surface area by as much as seventy percent. The greater the surface area, the more rapid freezing will take place, which yields a denser snow particle. This provides significantly enhanced snow quality, and improved grooming expense, uses less water and provides better energy output.

Other features, advantages, and aspects of the present invention will become more apparent and be more readily understood from the following detailed description, which should be read in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention is best understood by reference to the detailed description and examples set forth herein.

Embodiments of the invention are discussed below with reference to the examples. However, those skilled in the art will readily appreciate that the detailed description given herein with respect to these examples is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Figure 1:
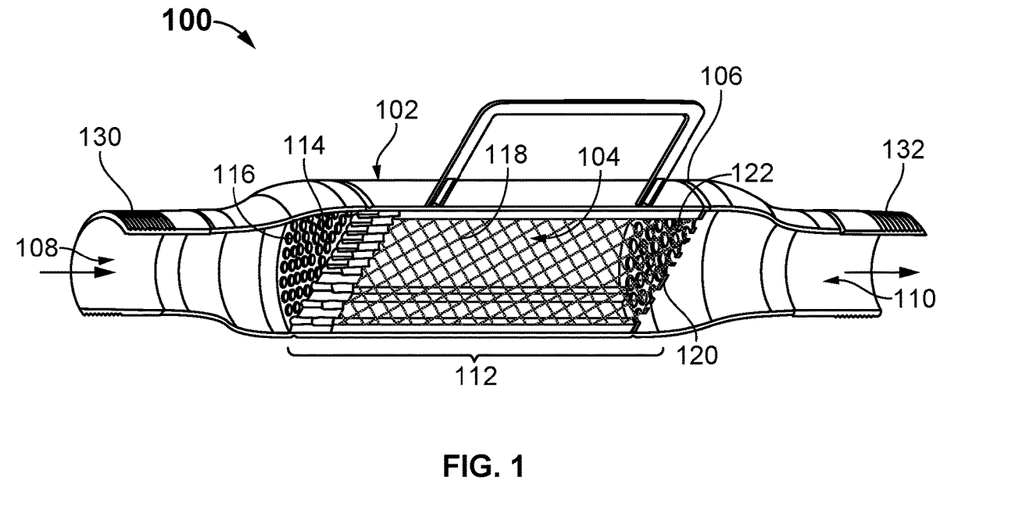
FIG. 1 illustrates a cut-away view of a device for creating a fluid nucleation in situ, according to an embodiment of the present invention.

Referring now to FIG. 1, a nozzle or device 100 that is operable with existing pumps or snow guns to create nanoparticle water nucleation sites in situ is disclosed. The device may also be connected to a pump to clean and pH balance water, including but not limited to swimming pool water. The device 100 comprises a housing 102, a cylindrical tube 112, a diffuser 114, a mesh framework 118 and an end plate 120. The housing 102 comprises a hollow interior 104, an outer cylindrical wall 106, an inlet 108 and an outlet 110.

The housing 102 may be formed of metals, metal alloys, or ceramics. However, optional embodiments, any material with a hardness that will stand up to the effects of cavitation may be use.

In one embodiment, the radially inner cylindrical tube 112 is concentrically positioned inside the housing 102. The inner cylindrical tube 112 defines a fluid nucleation or cavitation zone. In one embodiment, the diffuser 114 is disposed in the cylindrical tube 112 at a first end toward the inlet 108. The diffuser 114 comprises a plurality of orifices 116, which may be sized according to end use. The diffuser 114 is configured to break apart the water molecule clusters and provide nano-particles. In one embodiment, the mesh framework 118 is disposed in the cylindrical tube 112. The mesh framework extends longitudinally within the tube 112 in the nucleation zone. In some embodiments, the mesh framework 118 may be held or retained by a series of baffles disposed between diffuser 114 and end plate 120 in the hollow interior 104 of the cylindrical tube 112. In some embodiments, the mesh framework 118 may be held or retained by a pair of baffles at the top portion and a pair of baffles at the bottom portion of the hollow interior 104 of the cylindrical tube 112 therein.

The mesh framework 118 may be formed of copper together with other metals, and is formed as a fibrous network akin to that of the appearance of steel wool. The copper has a pH balancing effect on the fluid while the other stronger metals it may be used with provides enhanced strength. The mesh framework 118 is configured to suspend the water molecules that have been fissured by the diffuser. In one embodiment, the end plate 120 is disposed in the cylindrical tube 112, and comprises a predetermined amount of perforations 122. In one embodiment, the end plate 120 is located at or near the outlet 110.

In another embodiment, device 100 further comprises a first connection member 130 at the inlet 108. In another embodiment, the first connection member 130 comprises a threaded end configured to connect to a fluid source. In yet another embodiment, device 100 further comprises a second connection member 132 at the outlet 110. In one embodiment, the second connection member 132 comprises a threaded end, which is configured to connect to a snow gun 124 (shown in FIG. 5). In this way, the device is connectable to a pump at the inlet, and a snow gun on the outlet. Or, in optional embodiments, it is connectable to a pump one end a feedback loop on the other to clean and pH balance water, such as swimming pool water.

Figure 2A:
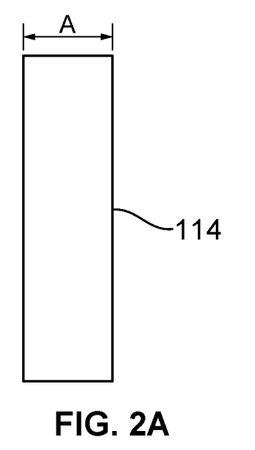
FIG. 2A illustrates a side view of a diffuser in an embodiment of the present invention.
Figure 2B:
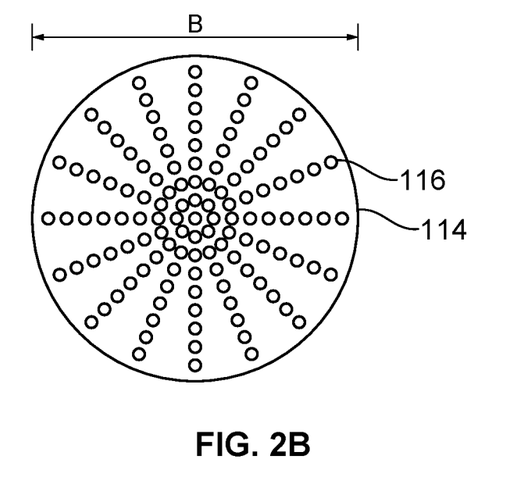
FIG. 2B illustrates a rear view of the diffuser in an embodiment of the present invention.

Referring to FIG. 2A, the diffuser 114 is 1 inch in width, which is represented as "A". Referring to FIG. 2B, the diffuser 114 is 3 or 4 inch in diameter, which is represented as "B". In some embodiments, the diffuser 114 is made of a single piece of stainless steel. The diffuser 114 comprises plurality of orifices 116 in concentric opening configuration. The diffuser 114 may be formed of steel, alloy and the like.

Figure 3A:
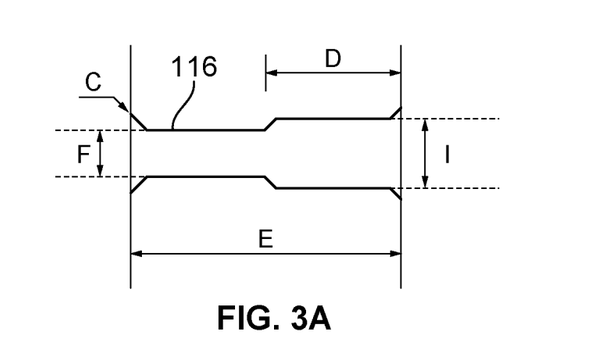
FIG. 3A illustrates a side view of an orifice in an embodiment of the present invention.
Figure 3B:
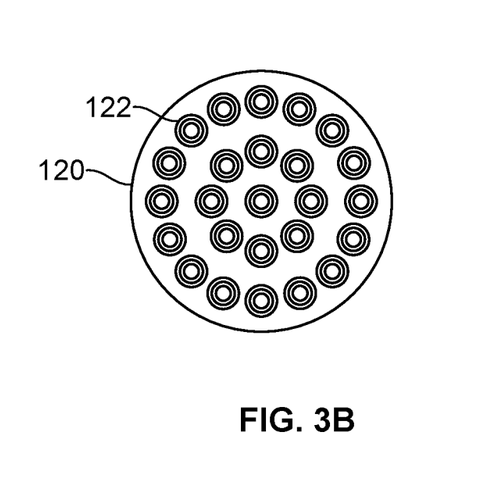
FIG. 3B illustrates a front view of the end plate in an embodiment of the present invention.

FIG. 3A exemplarily illustrates a side view of an orifice 116 of the diffuser 114 in an embodiment of the present device. In one embodiment, the orifice 116 of the diffuser 114 is 1 inch in width, which is represented as "E". In another embodiment, the orifices 116 are concentric opening having diameter of 0.1562 inches inch and a depth of 0.5 inches. In yet another embodiment, the orifice 116 of the diffuser 114 comprises an entry dimension of 5/32 inch ("F") in diameter with an approximately 45-degree ("C") chamfer and ½ inch in depth from the entry or input side of the orifices 116. Additionally, the orifice 116 of the diffuser 114 comprises an output dimension of 7/32 inch ("I") in diameter and ½ inch ("D") in depth from the exit or output side of the orifice 116. Referring to FIG. 3B, the output dimension of the orifices 116 of the diffuser 114 are illustrated.

Figure 4:
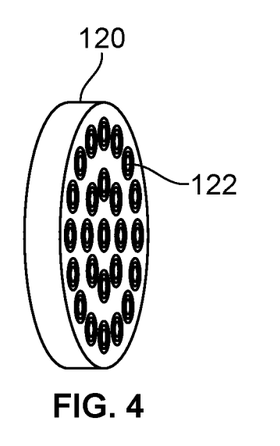
FIG. 4 illustrates a side perspective view of an end plate in an embodiment of the present invention.

FIG. 4 exemplarily illustrates a side perspective view of the end plate 120 in an embodiment of the present device. In one embodiment, the end plate 120 is ⅛ inches in width. In one embodiment, the end plate 120 is 3 inches or 4 inches in diameter. The end plate 120 comprises plurality of holes or perforations 122 in concentric opening configuration. The end plate 120 is configured to hold the metal mesh in place and further, enhance the ability to utilize a collective source of water molecules for a variety of applications.

In one embodiment, the end plate 120 comprises a combination of holes or perforations 122 having a diameter of 0.25 inches aligned in a concentric circle.

Figure 5:
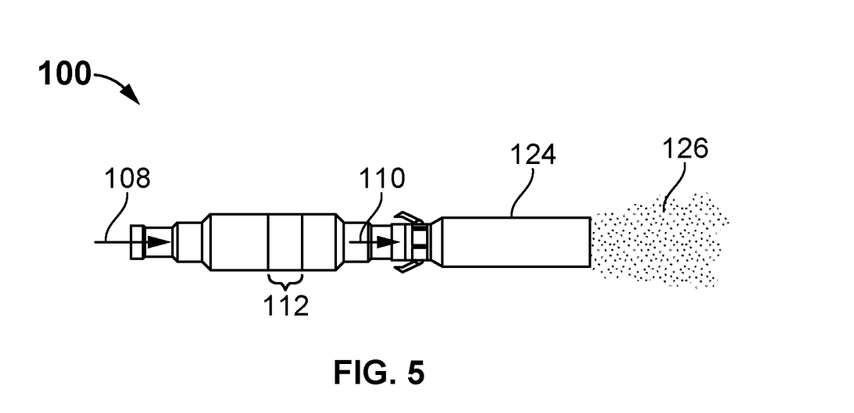
FIG. 5 illustrates the device attached to a snow gun in an embodiment of the present invention.

In an embodiment shown in FIG. 5, the operation of the nozzle 100 is disclosed. The nozzle 100 is connected to a fluid source at an inlet 108, wherein the nozzle 100 comprises a diffuser 114, a mesh framework 118 and an end plate 120. The diffuser 114 is configured to break bonds between adjoining fluid molecules and create a nucleation event. Then, the orifices 116 of the diffuser 114 are configured to increase a pressure on the fluid to create a heat signature, and the heat signature is configured to cleanse the fluid of foreign matter including but not limited to bacteria, metals, and viruses. The separated molecules are configured to pass through the mesh framework 118 that causes the water molecules to remain in a suspended state and balance the pH of the fluid. The end plate with its orifices or holes then allows the fluid to exit the device 100.

In one embodiment, the mesh framework 118 is a metal alloy mesh. In some embodiments, the mesh network 118 is a combination copper/metal mesh network. In embodiments, the end plate 120 comprises perforations 122 with gauges of approximately 5/32 inches to 7/32 inches, though could be larger or smaller depending upon application. The end plate 120 is configured to create a partial fusion process in which the water molecules come back together in close proximity but un-bonded. Then, end plate 120 is configured to create single molecule water particle, which instantly freeze providing nano-clusters of snow particles 126 and the outlet 110 is configured to attach to a snow gun 124, as shown in FIG. 5.

Figure 6:
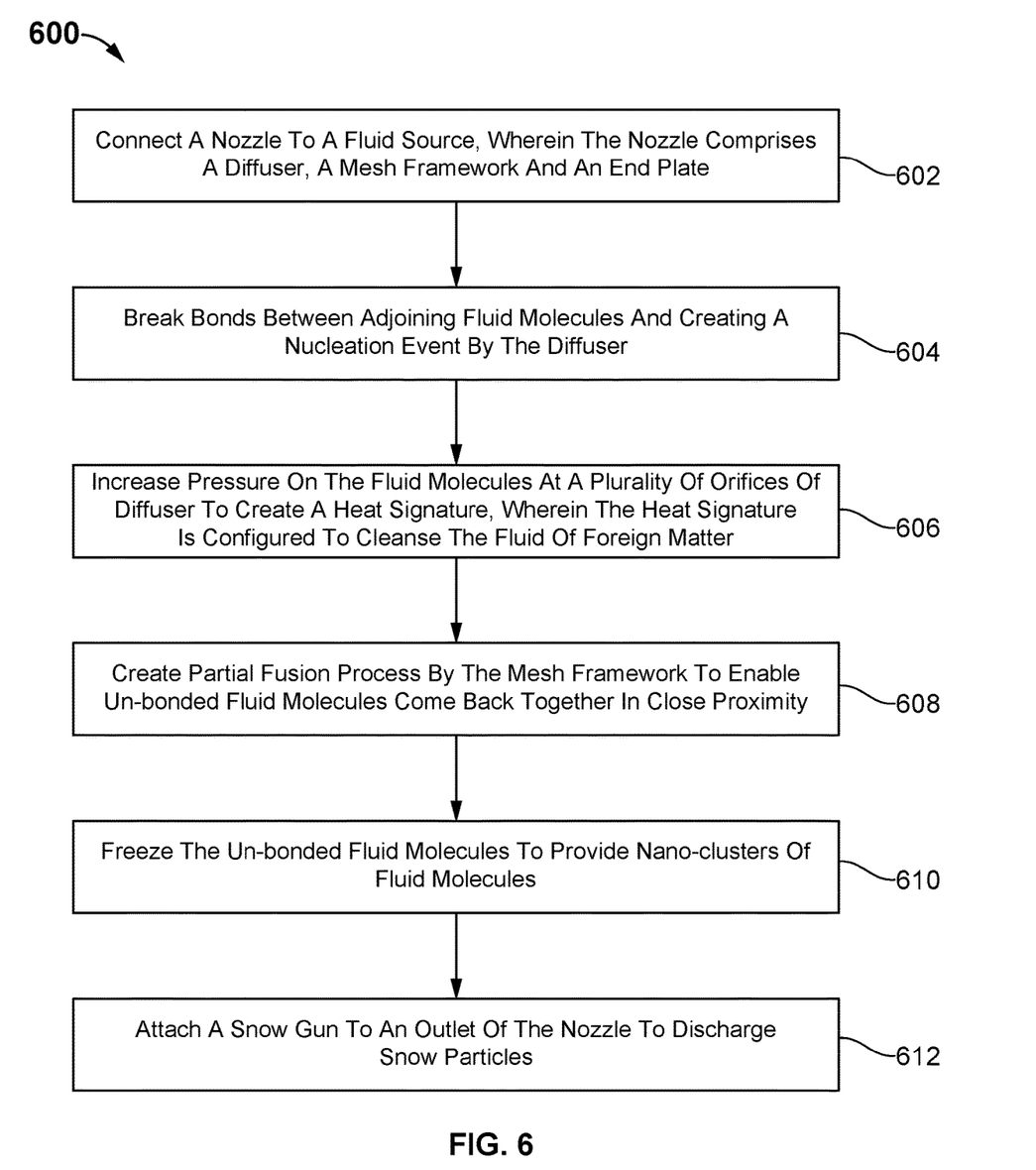
FIG. 6 illustrates a flowchart of a method for creating a fluid nucleation in situ in an embodiment of the present invention.

FIG. 6 exemplarily illustrates a flowchart of a method 600 for creating a fluid nucleation in situ using a nozzle or device 100 (shown in FIGS. 1-5) in an embodiment of the present device. At step 602, the nozzle 100 is connected to a fluid source at an inlet 108, wherein the nozzle 100 comprises a diffuser 114, a mesh framework 118 and an end plate 120. At step 604, the diffuser 114 is configured to break bonds between adjoining fluid molecules and creating a nucleation event. At step 606, the pressure on the fluid molecules is increased at the plurality of orifices 116 of diffuser 114 to create a heat signature, wherein the heat signature is configured to cleanse the fluid of foreign matter. At step 608, the mesh framework 118 is configured to create partial fusion process to enable un-bonded fluid molecules come back together in close proximity. At step 610, the un-bonded fluid molecules are frozen to provide nano-clusters of fluid molecules. At step 612, optionally, the snow gun 124 is attached to an outlet 110 of the nozzle 100 to discharge snow particles 126.

Advantageously, the present device provides an intermediary device or nozzle 100 that is positioned within the flow of water and functions by the pressure created from a pump or other device to increase the pressure of water flow through a confined space such as a hose or pipe. The present device further provides a fission process that breaks the surface tension and bond between adjoining fluid molecules. The present device further creates a heat signature that forces the water molecules apart in a hydrophobic environment, and burns off any foreign matter, thereby cleansing the fluid molecule. The present device further provides a mesh framework 118 that creates a partial fusion process in which the un-bonded fluid molecules come back together in close proximity. The device 100 is provided with an ability to manipulate the bonding and un-bonding of water molecules within a pressurized environment.

Further, multiple results and outcomes could be achieved by varying the number of perforations 122 or orifices 116 that enhance the ability to utilize a collective source of fluid or water molecules in a variety of applications. The device 100 further provides water free of bacteria, algae, and other foreign matter and contaminants while maintaining a balanced pH level, for example, the device 100 could be incorporated in a swimming pool. In another application, the device 100 could provide a larger water crystal or snow particles when the individual water molecule is exposed to freezing temperatures.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

I claim:

1. A nozzle for creating a fluid nucleation in situ, the nozzle comprising:

- a housing having a hollow interior, an outer cylindrical wall, an inlet and an outlet;
- a radially inner cylindrical tube concentric with the housing wherein the inner cylindrical tube defines a fluid nucleation zone;
- a diffuser disposed in the cylindrical tube proximate the inlet, wherein the diffuser breaks bonds between adjoining fluid molecules to create a nucleation event;
- a mesh framework disposed in the cylindrical tube, wherein the mesh framework is spaced from the diffuser, and extends longitudinally within the cylindrical tube in the nucleation zone; and
- an end plate having a predetermined amount of perforations therein, wherein the end plate is disposed in the cylindrical tube and is spaced from the mesh framework at or near the outlet.

2. The nozzle of claim 1, further comprising a first connection member at the inlet for connection to a fluid source.

3. The nozzle of claim 2, further comprising a second connection member at the outlet, wherein the second connection member is configured for connection to a snow gun, wherein the second connection member comprises a threaded end.

4. The nozzle of claim 1, wherein the diffuser comprises a plurality of orifices thereon, wherein the orifices are configured to create a heat signature to cleanse the fluid of foreign matter by creating a cavitation event, and wherein the orifices each comprise an approximately forty-five degree chamfer.

5. The nozzle of claim 4, wherein the orifices comprise concentric openings having diameter of 0.1562 inches, and wherein the orifices have a depth of 0.5 inches.

6. The nozzle of claim 4, wherein the fluid is water molecules, and the mesh framework comprises a metal alloy mesh.

7. The nozzle of claim 6, wherein the perforations comprises orifices with gauges of approximately 0.156 inches to 0.218 inches.

8. The nozzle of claim 1, wherein the end plate retains the mesh framework, and wherein the end plate is approximately 4 inches in diameter and is 0.125 inches wide.

9. The nozzle of claim 1, wherein the fluid is water, the inlet is attachable to a pump, and the end-plate creates single molecule water particles which instantly freeze to provide nano-clusters, and the outlet is configured to attach to a snow gun.

10. A method for creating a fluid nucleation in situ, comprising the steps of:

- connecting a nozzle to a fluid source, wherein the nozzle comprises;
  - a housing having a hollow interior, an outer cylindrical wall, an inlet and an outlet;
  - a radially inner cylindrical tube concentric with the housing, wherein the inner cylindrical tube defines a fluid nucleation zone;
  - a diffuser disposed in the cylindrical tube proximate the inlet;
  - a mesh framework disposed in the cylindrical tube; and
  - an end plate having a predetermined amount of perforations therein, wherein the end plate is disposed in the cylindrical tube and is spaced from the mesh framework at or near the outlet,
- breaking bonds between adjoining fluid molecules and creating a nucleation event using the diffuser;
- increasing pressure on the fluid molecules at a plurality of orifices of the diffuser to create a heat signature, wherein the heat signature is configured to cleanse the fluid of foreign matter; and
- creating a partial fusion process by the mesh framework to enable un-bonded fluid molecules to come back together in close proximity.

11. The method of claim 10, further comprising:

- freezing the un-bonded fluid molecules to provide nano-clusters of fluid molecules, and
- attaching a snow gun to the outlet of the nozzle.

12. The method of claim 10, further comprising attaching a pump at the inlet and a feedback loop at the outlet to clean pool water.

* * * * *

(12) EX PARTE REEXAMINATION CERTIFICATE (12156th)
United States Patent
Wambsgans (10) Number: US 11,052,411 C1
(45) Certificate Issued: Oct. 21, 2022

(54) DEVICE AND METHOD TO CREATE NANO-PARTICLE FLUID NUCLEATION SITES IN SITU

(71) Applicant: Richard Marcelin Wambsgans, Gallatin Gateway, MT (US)

(72) Inventor: Richard Marcelin Wambsgans, Gallatin Gateway, MT (US)

(73) Assignee: Richard Marcelin Wambsgans

Reexamination Request:
No. 90/014,933, Dec. 22, 2021

Reexamination Certificate for:
Patent No.: 11,052,411
Issued: Jul. 6, 2021
Appl. No.: 16/158,126
Filed: Oct. 11, 2018

Related U.S. Application Data

(60) Provisional application No. 62/570,676, filed on Oct. 11, 2017.

(51) Int. Cl.
*B05B 7/08* (2006.01)
*C02F 103/42* (2006.01)
*C02F 1/00* (2006.01)
*F25C 3/04* (2006.01)
*B05B 1/14* (2006.01)

(52) U.S. Cl.
CPC .................. *B05B 7/08* (2013.01); *B05B 1/14* (2013.01); *C02F 1/001* (2013.01); *C02F 2103/42* (2013.01); *C02F 2303/04* (2013.01); *F25C 3/04* (2013.01); *F25C 2303/046* (2013.01); *F25C 2303/048* (2013.01); *F25C 2303/0481* (2013.01); *F25C 2500/02* (2013.01)

(58) Field of Classification Search
None
See application file for complete search history.

(56) References Cited

To view the complete listing of prior art documents cited during the proceeding for Reexamination Control Number 90/014,933, please refer to the USPTO's Patent Electronic System.

*Primary Examiner* — Beverly M Flanagan (57) ABSTRACT

A nozzle device and method for creating a fluid nucleation in situ, is disclosed. The nozzle has a housing having a hollow interior, an outer cylindrical wall, and inlet and an outlet, and a diffuser disposed in the cylindrical tube at a first end toward the inlet. The diffuser is configured to break bonds between adjoining fluid molecules and create a nucleation event. The nozzle further has a mesh framework disposed in the cylindrical tube and extending longitudinally within the tube in the nucleation zone, and is configured to manipulate the bonding and un-bonding of water molecules within a pressurized environment for the production of snow, clean water or both.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-12 are cancelled.

\* \* \* \* \*